United States Patent
Lim

(10) Patent No.: US 12,362,090 B2
(45) Date of Patent: Jul. 15, 2025

(54) HIGH-EFFICIENCY RESONANT INDUCTANCE COUPLING TYPE WIRELESS POWER TRANSFER USING A COMBINED COIL STRUCTURE

(71) Applicant: Telefonaktiebolaget LM Ericsson (publ), Stockholm (SE)

(72) Inventor: Junyoul Lim, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 31 days.

(21) Appl. No.: 18/035,132

(22) PCT Filed: Nov. 5, 2020

(86) PCT No.: PCT/KR2020/015386
§ 371 (c)(1),
(2) Date: May 3, 2023

(87) PCT Pub. No.: WO2022/097777
PCT Pub. Date: May 12, 2022

(65) Prior Publication Data
US 2024/0006114 A1    Jan. 4, 2024

(51) Int. Cl.
*H01F 27/29* (2006.01)
*H01F 27/42* (2006.01)
(Continued)

(52) U.S. Cl.
CPC .......... *H01F 27/29* (2013.01); *H01F 27/42* (2013.01); *H02J 50/12* (2016.02); *H02J 50/402* (2020.01)

(58) Field of Classification Search
CPC .......... H01F 27/29; H01F 27/42; H02J 50/12; H02J 50/402
See application file for complete search history.

(56) References Cited

U.S. PATENT DOCUMENTS 10,650,964 B2    5/2020   Xu et al.
2012/0267960 A1   10/2012   Low et al.
(Continued)

FOREIGN PATENT DOCUMENTS

| EP | 3036817 B1 | 8/2019 |
| KR | 20150034609 A | 4/2015 |
| KR | 20190046250 A | 5/2019 |

OTHER PUBLICATIONS

Extended European Search Report dated Jun. 18, 2024 for European Patent Application No. 20960879.3, 5 pages.

*Primary Examiner* — Daniel Cavallari
(74) *Attorney, Agent, or Firm* — Sage Patent Group

(57) ABSTRACT

The embodiments relate to high-efficiency resonant inductance coupling type wireless power transfer. In one embodiment, there proposes an apparatus for wireless power transferring, comprising: a first terminal and a second terminal; a combined coil coupled between the first terminal and the second terminal, wherein the combined coil including a first sub coil having a first end and a second end and a second sub coil having a first end and a second end, the first end of the first sub coil is coupled to the first terminal, the second end of the first sub coil is coupled to the first end of the second sub coil; a first filter coupled in series with the first sub coil at the first end or the second end of the first sub coil; and a second filter coupled between the first end of the second sub coil and the first terminal.

10 Claims, 14 Drawing Sheets

(51) Int. Cl.
*H02J 50/12* (2016.01)
*H02J 50/40* (2016.01)

(56) References Cited

U.S. PATENT DOCUMENTS

| | | |
|---|---|---|
| 2014/0347233 A1 | 11/2014 | Mahanfar et al. |
| 2016/0204836 A1 | 7/2016 | Lee et al. |
| 2017/0054213 A1 | 2/2017 | Singh et al. |
| 2018/0198323 A1* | 7/2018 | Widmer .................... H02J 7/04 |

* cited by examiner

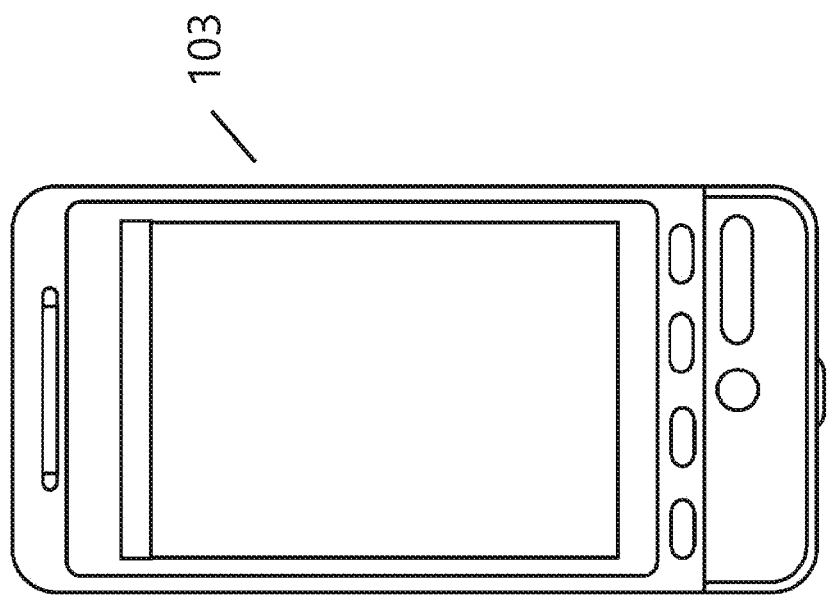
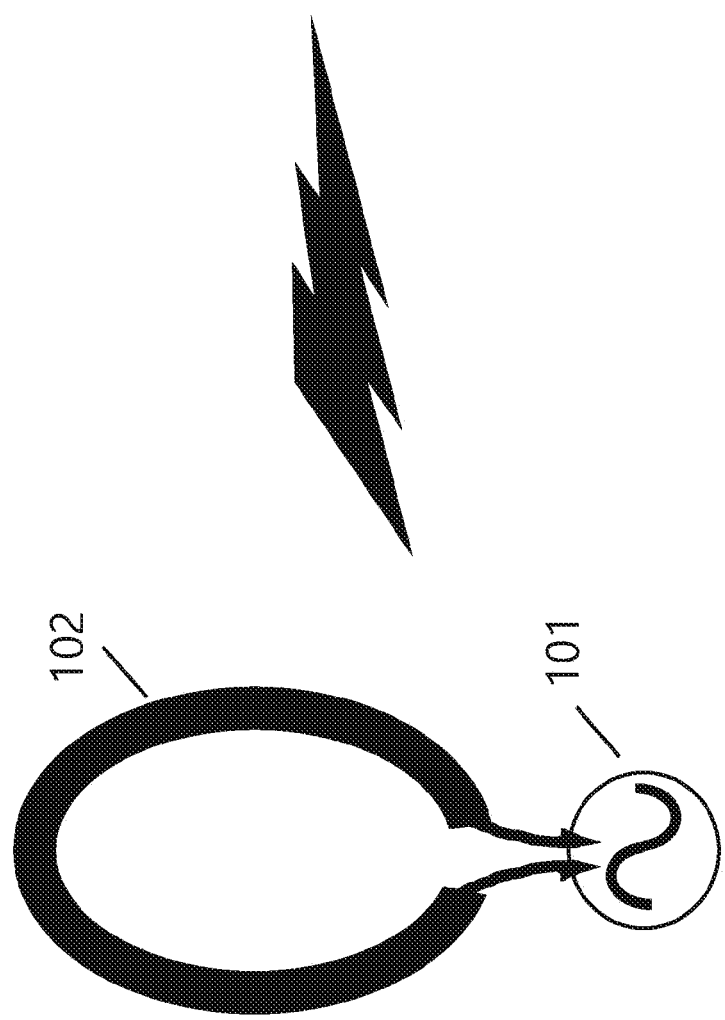
FIG. 1

[Fig. 3a]
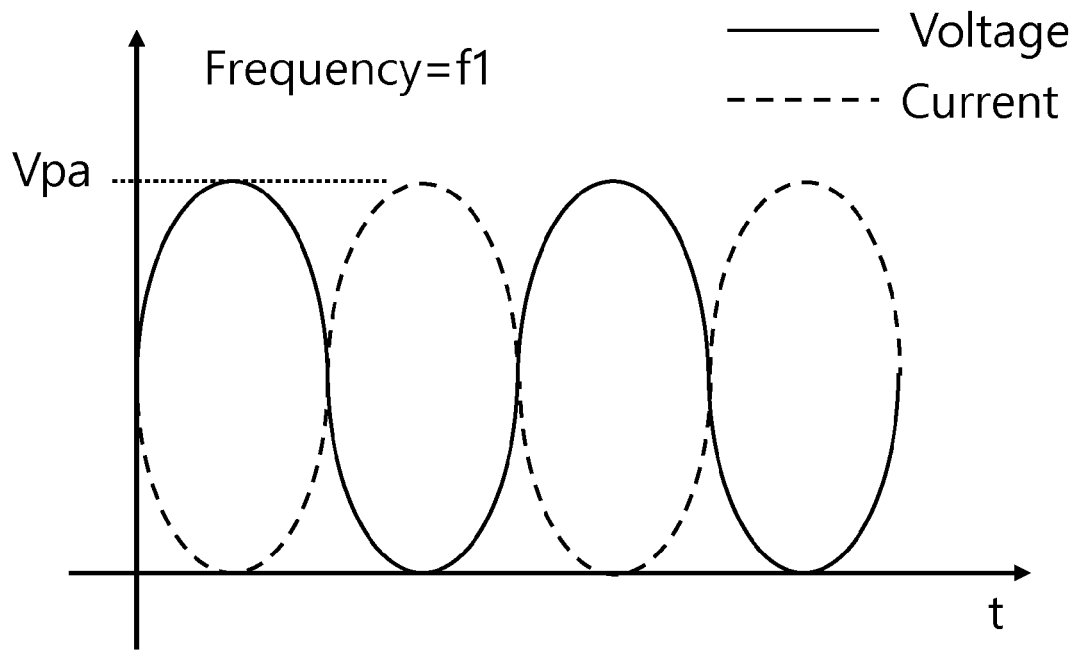
[Fig. 3b]
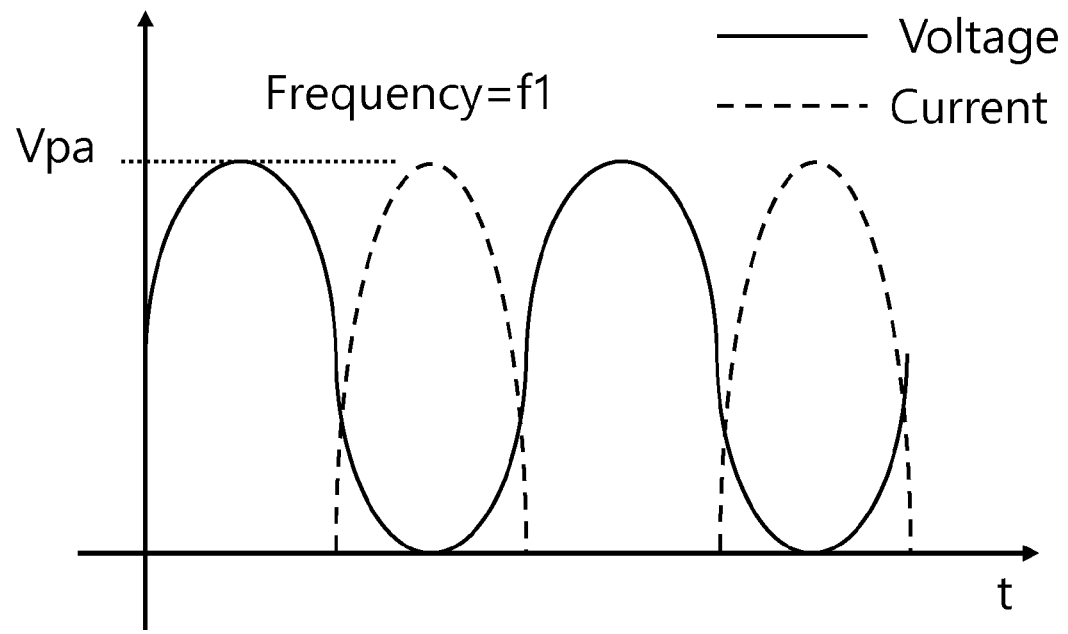

[Fig. 4]
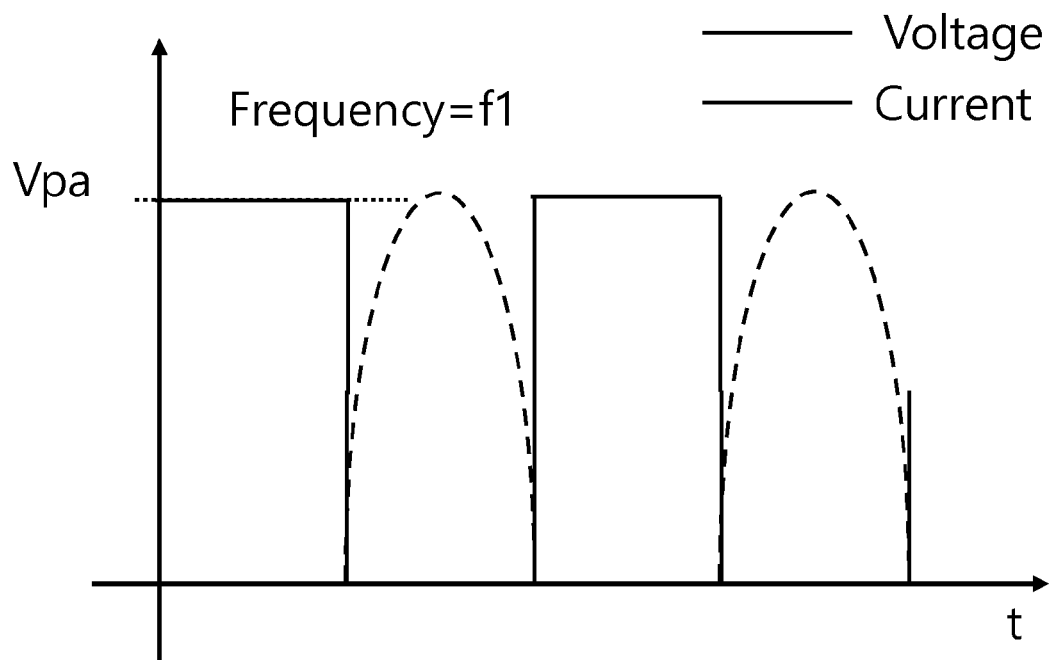
[Fig. 5a]
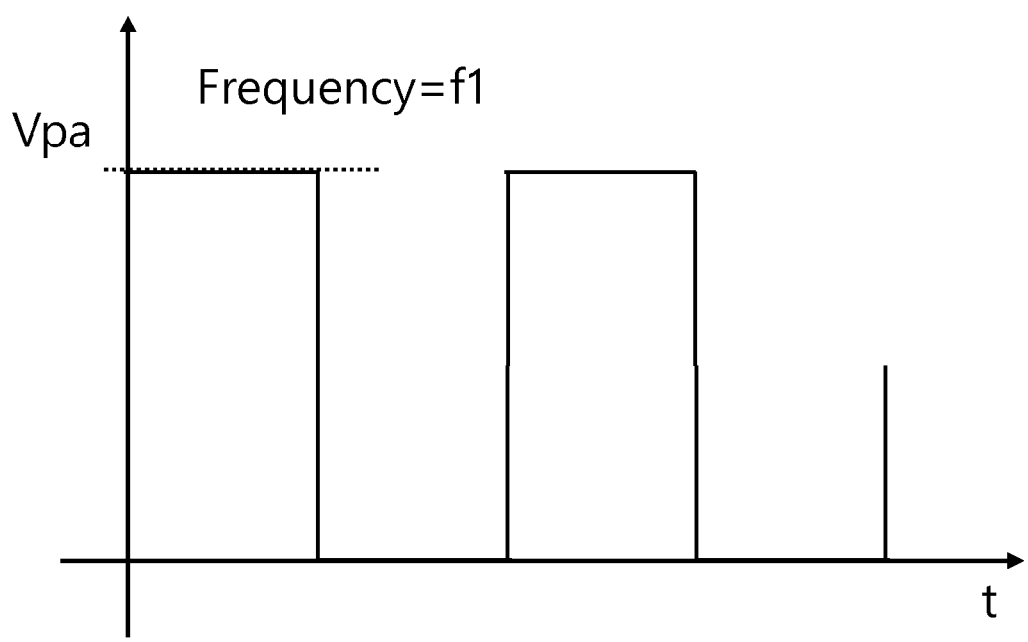

[Fig. 5b]
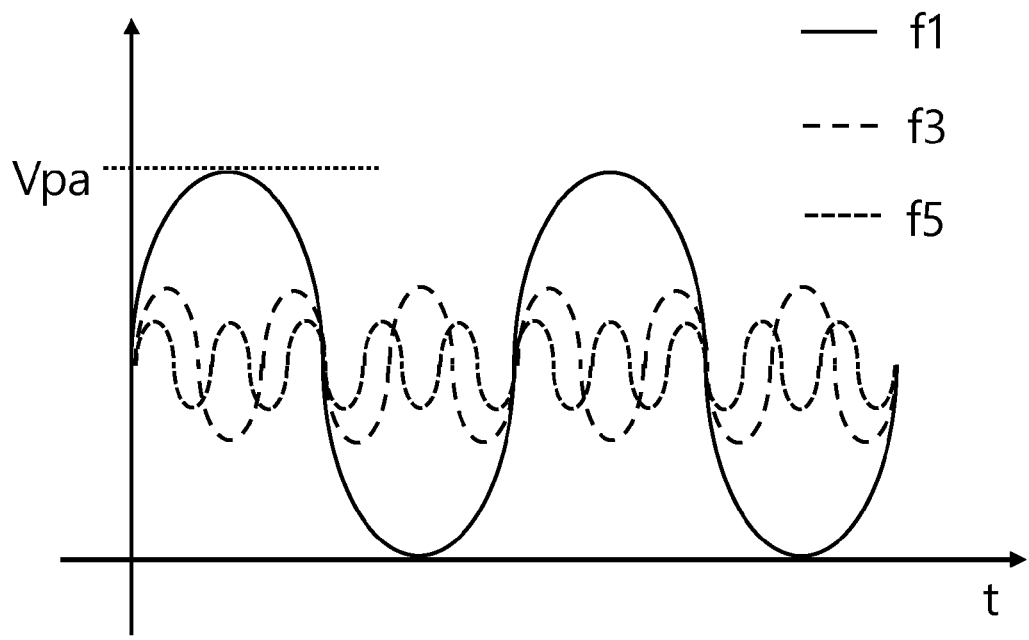
[Fig. 5c]
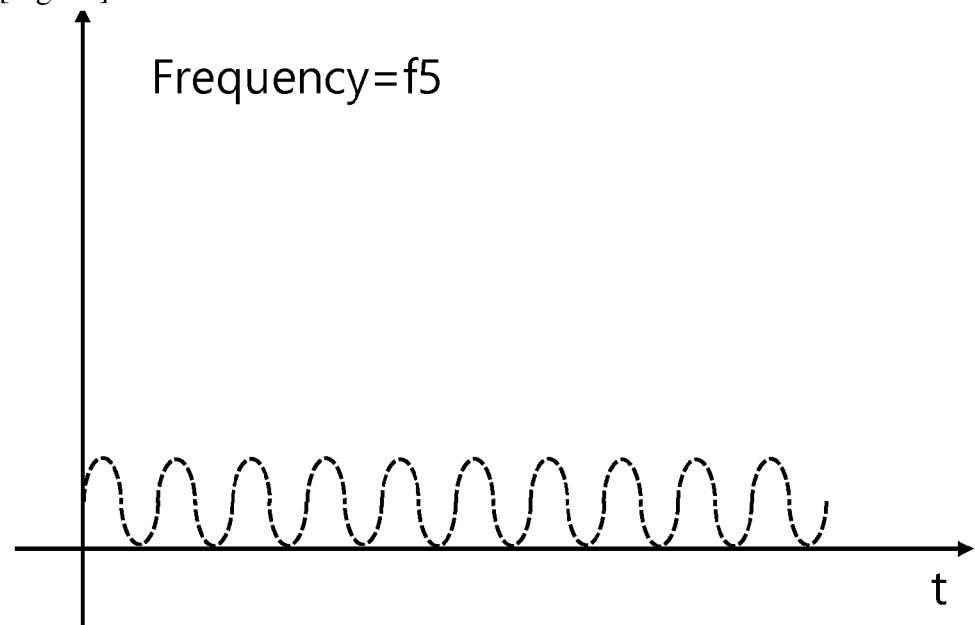

[Fig. 5d]
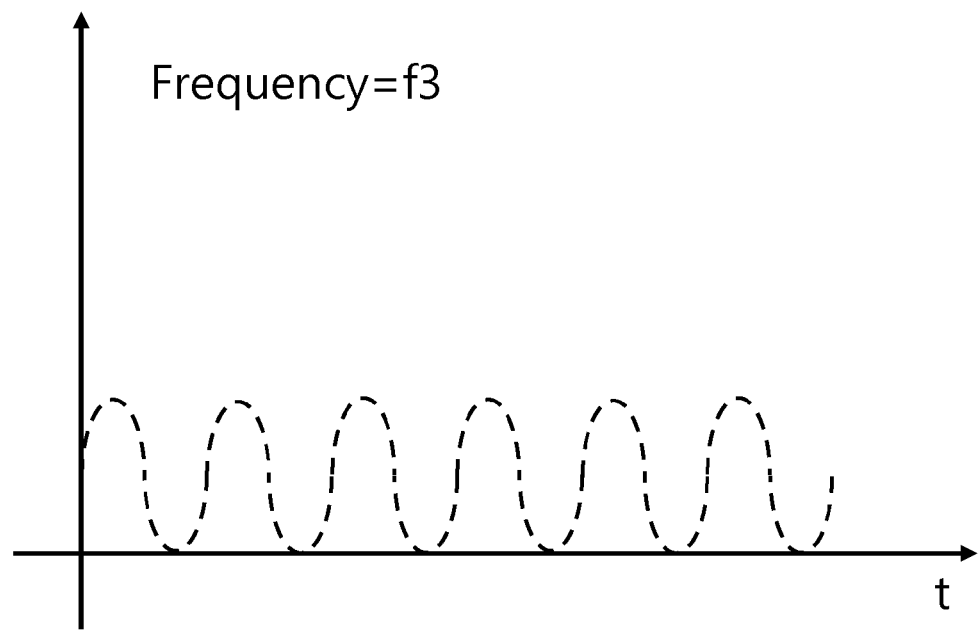

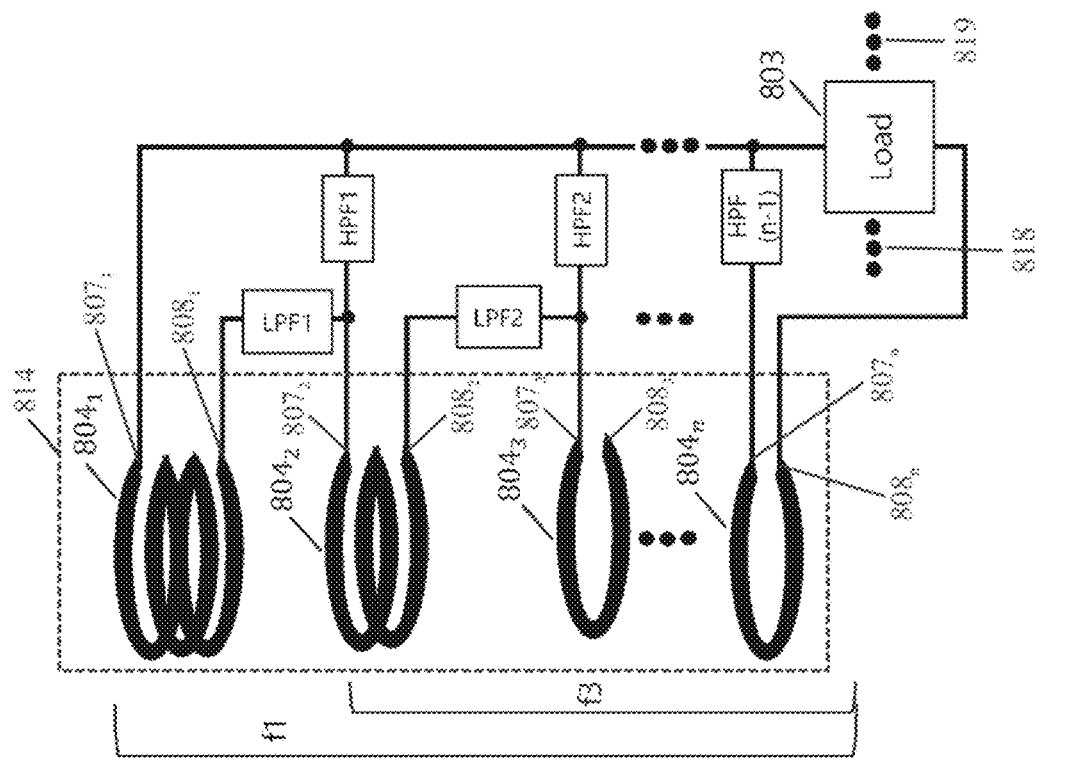
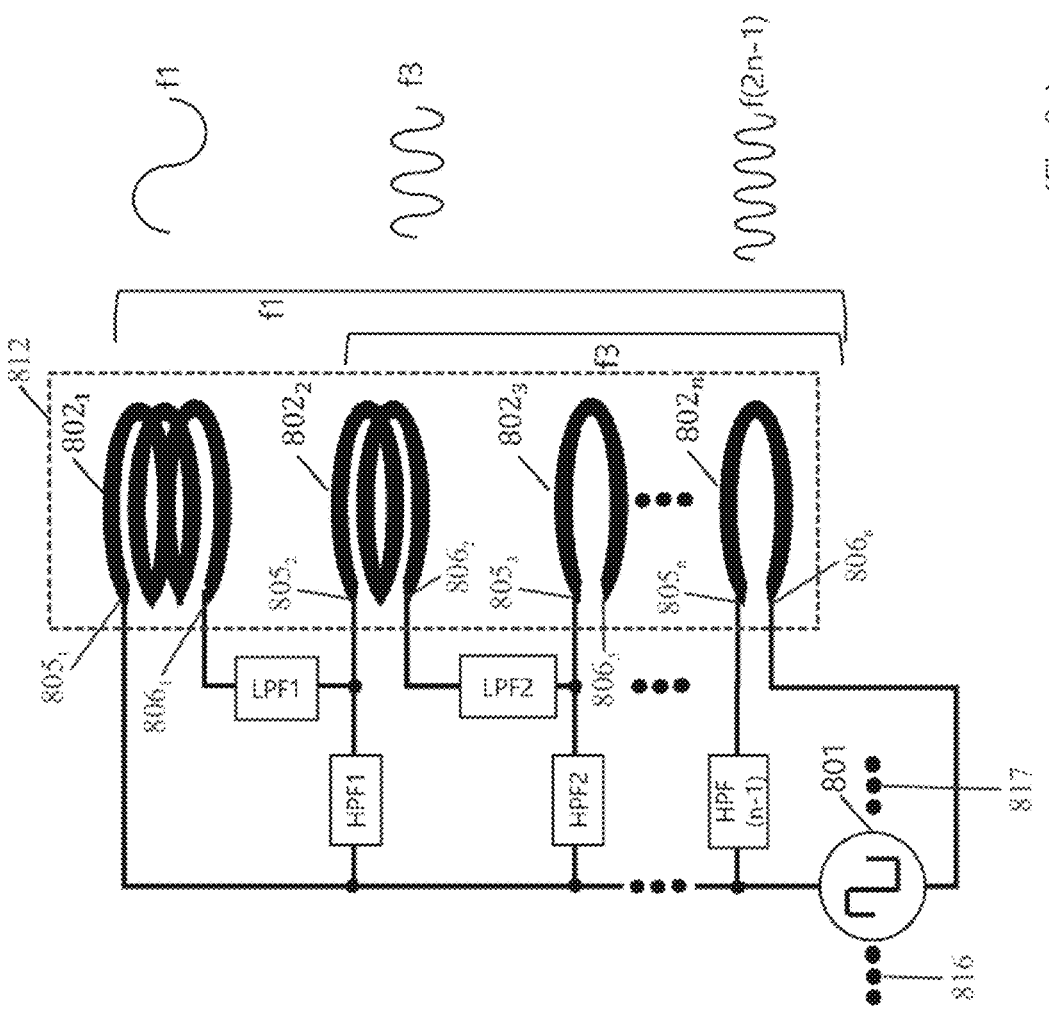
[Fig. 8a]

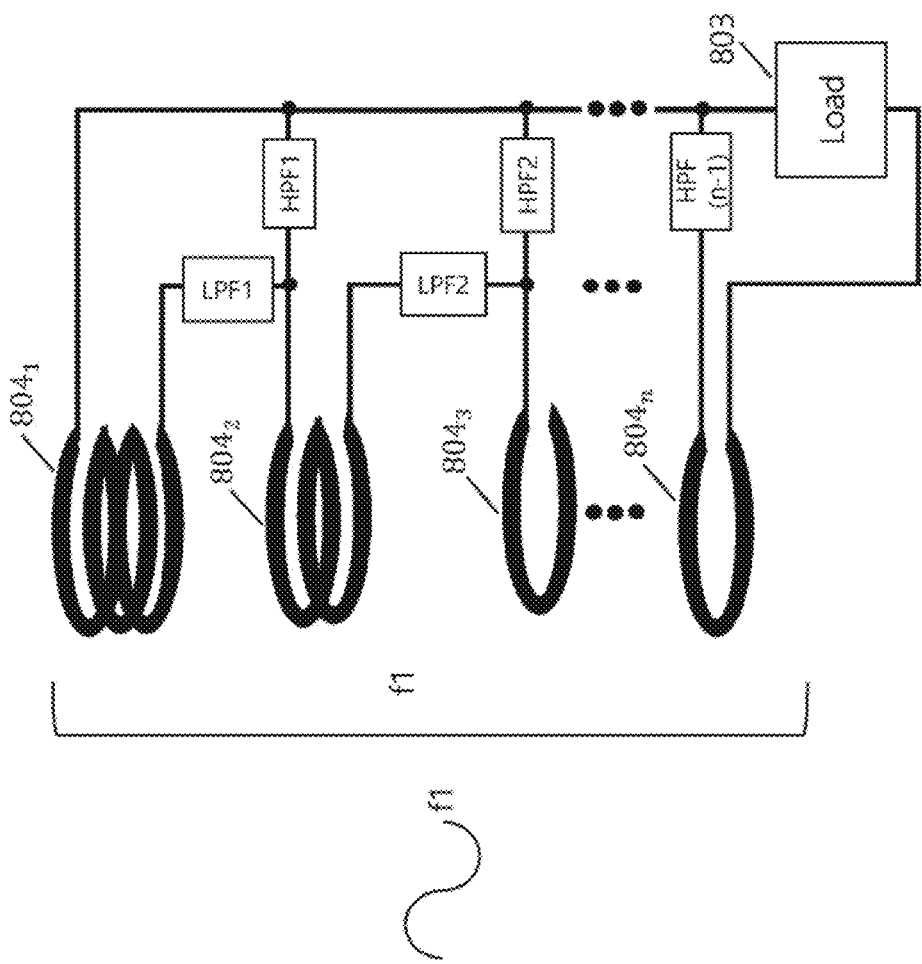
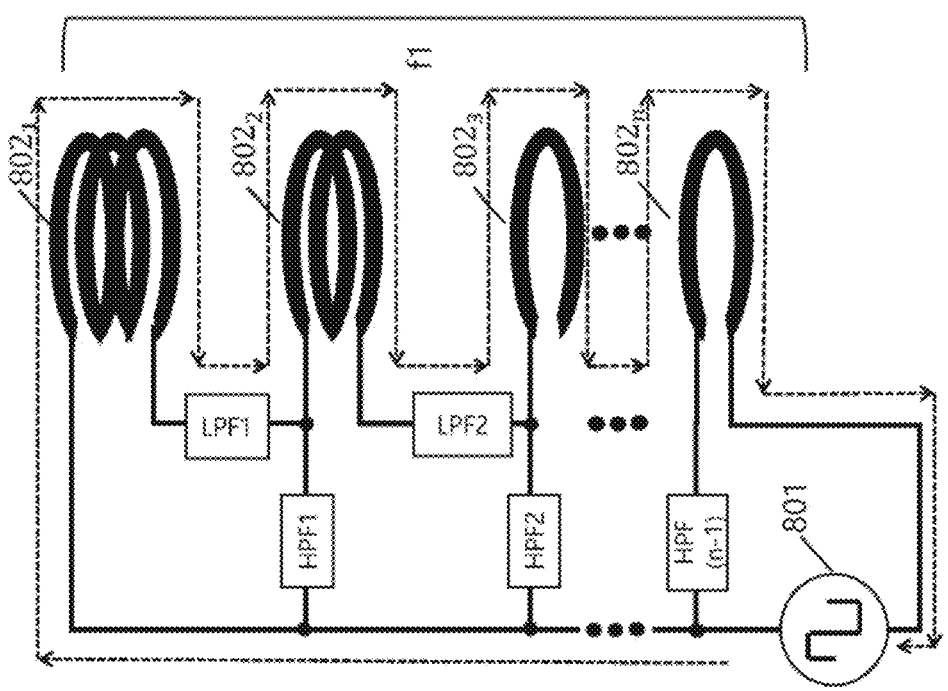
[Fig. 8b]

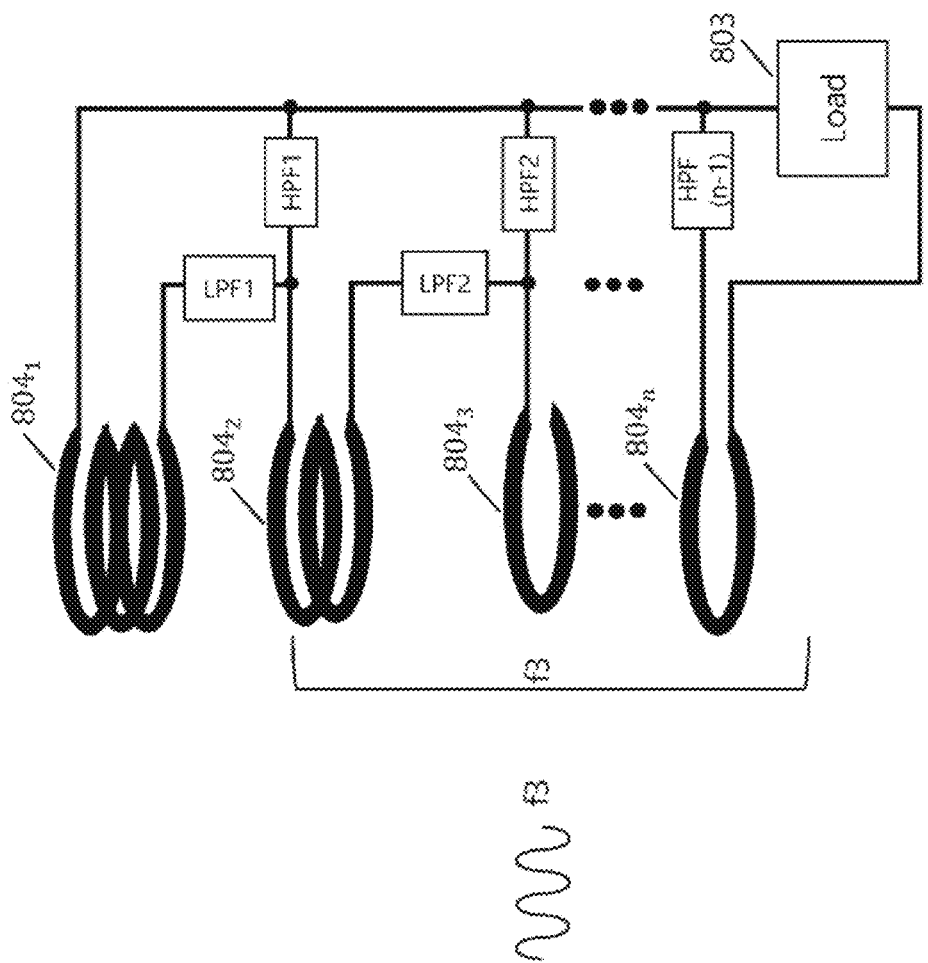
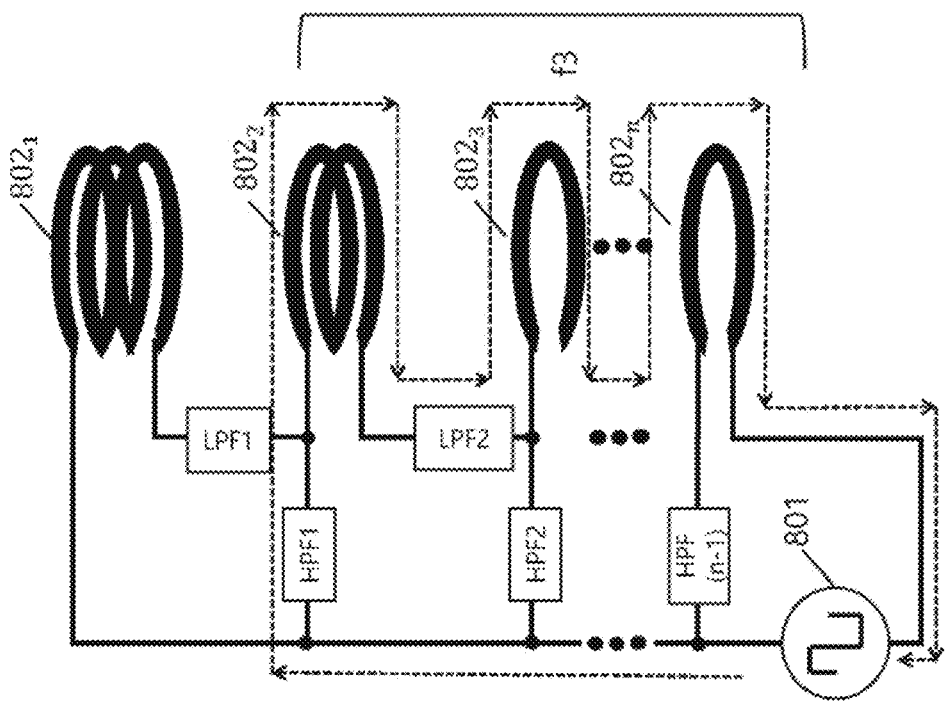
[Fig. 8c]

[Fig. 10]
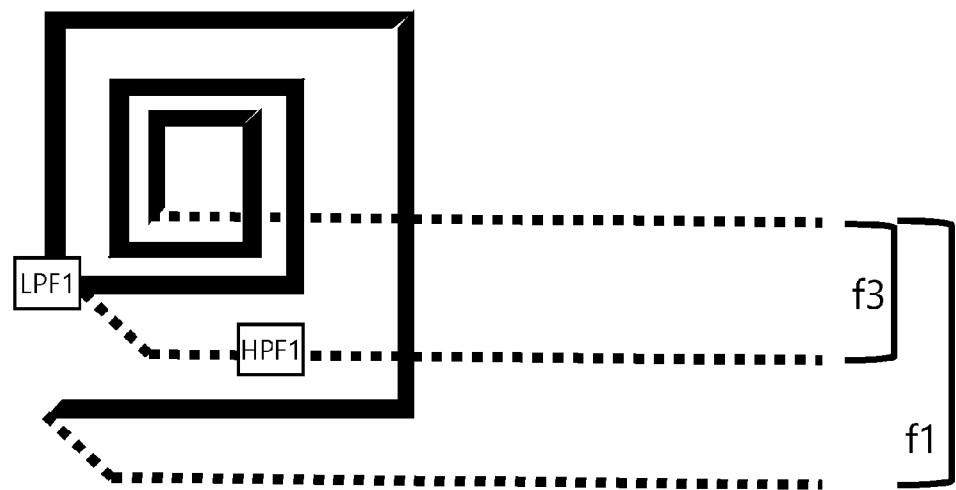

[Fig. 11]
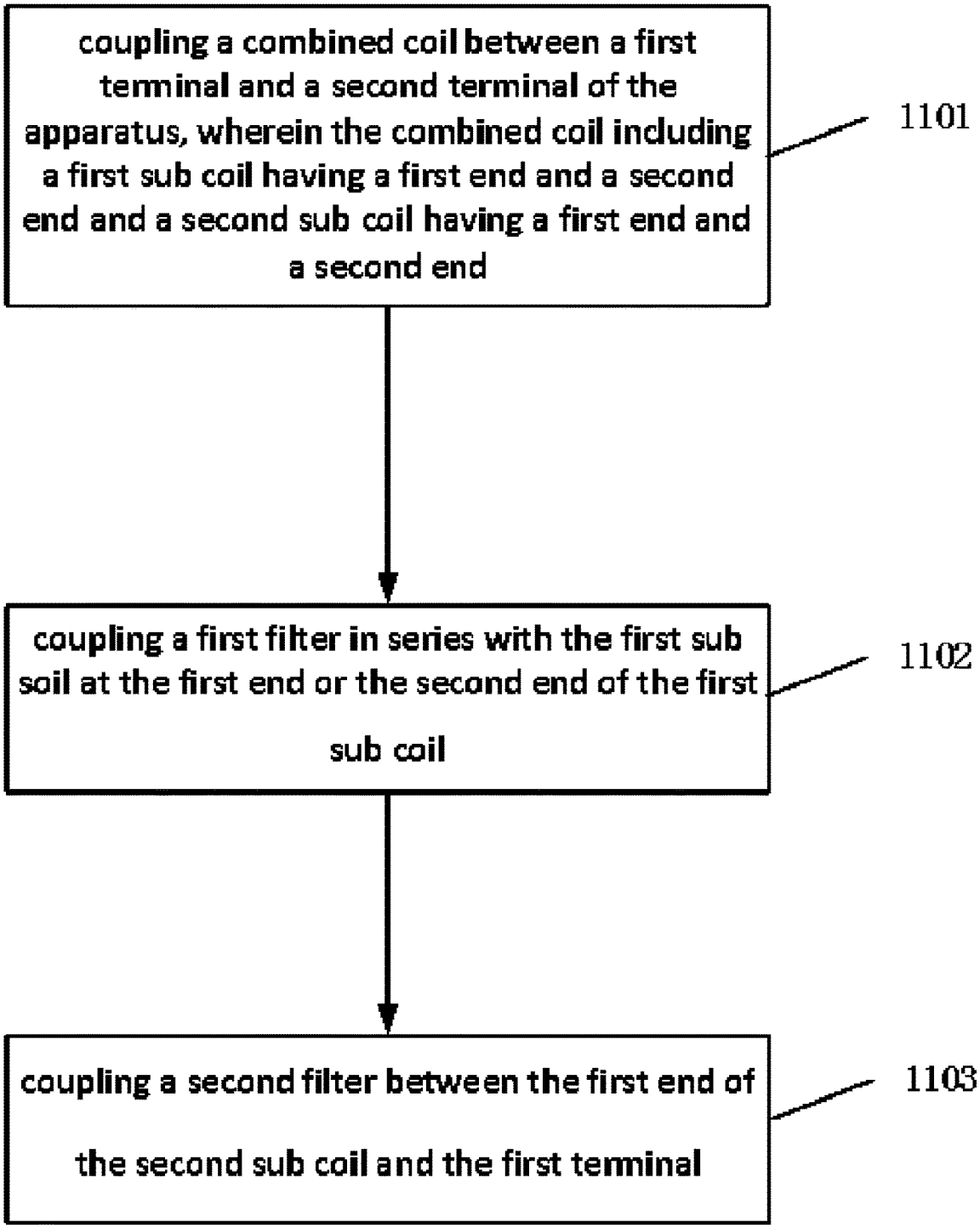

HIGH-EFFICIENCY RESONANT INDUCTANCE COUPLING TYPE WIRELESS POWER TRANSFER USING A COMBINED COIL STRUCTURE

TECHNICAL FIELD

The embodiments herein relate generally to the field of wireless power transfer, and more particularly, the embodiments herein relate to resonant inductance coupling type wireless power transfer using a combined coil structure

BACKGROUND ART

The use of electrical devices is increasing day by day. The charging of the electrical devices is always a big problem. In terms of charging performance, charging speed, power efficiency and convenience are the key metrics for the users.

Wireless power transfer can deliver the electric energy to the wanted devices without a power line. Thus, the charger using wireless power transfer can give users much convenience to charge their devices. In addition, wireless power transfer can give the manufacturers and the designers more freedom to design their devices.

Thus, wireless power transfer is expected to get used for more and more devices. For example, most of recent high-end mobile phones have the apparatus to charge its battery wirelessly. FIG. 1 shows the system architecture of the wireless power transfer system. As FIG. 1 shows, the power source 101 transmits the electrical power to a coil 102 in the power transmitting side. Then coil 102 can be housed in a charger. Then the coil 102 transfers the electrical power to the device 103 in the power receiving side wirelessly. Typically, the device 103 will have another coil for use with the coil 102 in the charger. The coil 102 can induce power in the coil of the device 103. The induced power is then transmitted to the battery of the device 103 to charge the battery.

The wireless power transfer with the resonant inductive coupling structure shows higher efficiency in the power transferring than the other types of wireless power transfer. FIG. 2 shows the structure of the resonant inductive coupling type wireless power transfer system. As shown in FIG. 2, the resonant inductive coupling type wireless power transfer system comprises a power source 201, a power amplifier 202, a coil in source 203, a coil in destination 204, a rectifier 205 and loads 206. The power source 201 generates Alternating Current (AC) power. The generated AC power will be transmitted to a power amplifier 202 to amplify the power of input AC signal. The coil in source 203 receives the amplified power of input and induces the magnetic flux. The induced magnetic flux generates the induced AC power on coil in the destination 204. The rectifier 205 then converts the induced AC power into DC power. DC power provides energy to the loads 206.

Those skilled in the art can understand that the power efficiency can increase when the frequency of the power source 201 matches with the resonant frequency of both the coil in source 203 and the coil in the destination 204.

Normally, the source 201 provides a sinusoidal input. FIG. 3a shows the voltage and the current waveform for class-A power amplifier with sinusoidal input and FIG. 3b shows the voltage and the current waveform for class-B power amplifier with sinusoidal input. As shown in FIGS. 3a and 3b, when the power source 201 provides sinusoidal signal the maximum power efficiency in the power amplifier 202 is about 50% for class-A power amplifier and 73.5% for class-B power amplifier. That is, 50% of power will be dissipated through heat when class-A power amplifier has maximum power efficiency and 26.5% of power will be dissipated through heat when class-B power amplifier has maximum power efficiency.

DISCLOSURE OF INVENTION

Technical Problem

As can be seen, the legacy wireless power transfer has low power efficiency and thus the charging speed is low. Therefore, a high-efficiency wireless power transfer is expected.

Solution to Problem

In view of above problem in the prior art, the embodiments herein propose to an apparatus for wireless power transferring which can improve the efficiency of the power transferring and increase the speed of charging without increasing the size of the coil.

According to a first aspect, there proposes an apparatus for wireless power transferring, comprising: a first terminal and a second terminal; a combined coil coupled between the first terminal and the second terminal, wherein the combined coil including a first sub coil having a first end and a second end and a second sub coil having a first end and a second end, the first end of the first sub coil is coupled to the first terminal, the second end of the first sub coil is coupled to the first end of the second sub coil; a first filter coupled in series with the first sub coil at the first end or the second end of the first sub coil; and a second filter coupled between the first end of the second sub coil and the first terminal, wherein the first filter allows a first frequency to pass and blocks a second frequency, wherein the second filter allows the second frequency to pass and blocks the first frequency, wherein the first frequency is lower than the second frequency.

In an embodiment, the first frequency is inversely proportional to the square root of the combined coil length, the second frequency is inversely proportional to the square root of the difference between the combined coil length and the first sub coil length.

In an embodiment, the combined coil further comprising a third sub coil having a first end and a second end and the apparatus further comprising: a third filter coupled between the first end of the third sub coil and the first terminal, the third filter allows the third frequency to pass and blocks the first frequency and the second frequency, and the third frequency is inversely proportional to the square root of the difference between the combined coil length and the sum of the first sub coil length and the second sub coil length.

In an embodiment, the first filter is a band pass filter or a low pass filter.

In an embodiment, the second filter is a band pass filter or a high pass filter.

In an embodiment the third filter is a band pass filter or a high pass filter.

In an embodiment, the first terminal and the second terminal are coupled across a power source, thereby the apparatus is configured as an apparatus for wireless power transmitting.

In an embodiment, the power source provides a square wave, wherein the fundamental frequency of the square wave corresponds to the resonant frequency of the combined coil.

In an embodiment, the first terminal and the second terminal are coupled across a load, thereby the apparatus is configured as an apparatus for wireless power receiving.

In an embodiment, the combined coil is in plane.

In an embodiment, the combined is in shape of circle or rectangular.

According to a second aspect, there proposes a method of manufacturing an apparatus for wireless power transferring, comprising: coupling a combined coil between a first terminal and a second terminal of the apparatus, wherein the combined coil including a first sub coil having a first end and a second end and a second sub coil having a first end and a second end, the first end of the first sub coil is coupled to the first terminal, the second end of the first sub coil is coupled to the first end of the second sub coil; coupling a first filter in series with the first sub soil at the first end or the second end of the first sub coil; and coupling a second filter between the first end of the second sub coil and the first terminal, wherein the first filter allows a first frequency to pass and blocks a second frequency, wherein the second filter allows the second frequency to pass and blocks the first frequency, wherein the first frequency is lower than the second frequency.

In an embodiment, the first frequency is inversely proportional to the square root of the combined coil length, the second frequency is inversely proportional to the square root of the difference between the combined coil length and the first sub coil length.

In an embodiment, the combined coil is in plane.

According to a third aspect, there proposes a method of operating any of the above apparatus according to the embodiments, comprising: providing a square wave between the first terminal and the second terminal of the apparatus, wherein the fundamental frequency of the square wave corresponds to the resonant frequency of the combined coil.

Advantageous Effects of Invention

With embodiments herein, the signals with different frequencies can be effectively transmitted by using a combined coil structure, thus the efficiency of the wireless power transfer is improved. As a result, the charging speed of the wireless power transfer is increased. In addition, the total length of the coil is not increased compared to the legacy solution.

BRIEF DESCRIPTION OF DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which:

FIG. 1 shows the system architecture of the wireless power transfer;

FIGS. 3a and 3b shows the voltage and the current waveform for class-A power amplifier and class-B power amplifier with sinusoidal input;

FIG. 4 shows the voltage and the current waveform for class-B power amplifier with square waveform input;

FIG. 5a to 5d shows a square wave, its Fourier transform and its harmonic components;

FIG. 8a shows a resonant inductive wireless power transfer using a combined coil according to another embodiment;

FIGS. 8b and 8c show the signal flow in the transmitting side according to an embodiment;

FIG. 10 shows an example combined coil that has rectangular form coil according to an embodiment;

FIG. 11 shows a method of manufacturing an apparatus for wireless power transferring according to an embodiment.

Figure 2:
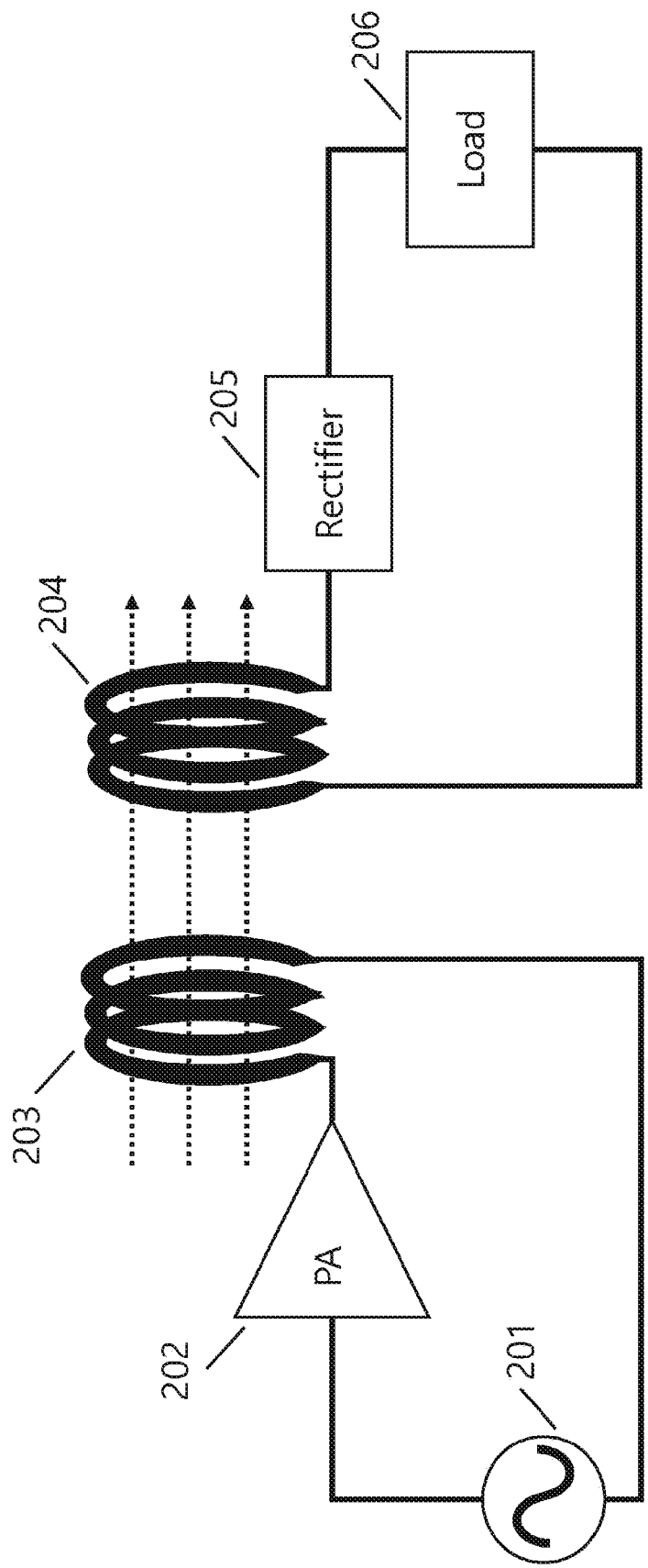
FIG. 2 shows the structure of the resonant inductive coupling type wireless power transfer system.

Unless otherwise indicated, the drawings provided herein are meant to illustrate features of embodiments of this application. These features are believed to be applicable in a wide variety of systems comprising one or more embodiments of this disclosure. As such, the drawings are not meant to include all conventional features known by those skilled in the art to be required for the practice of the embodiments disclosed herein.

MODE FOR THE INVENTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments herein propose a high efficiency structure for wireless power transfer.

As mentioned above, the input sinusoidal signal dissipates much power through heat in the power amplifier. FIG. 4 shows the voltage and the current waveform for class-B power amplifier with square waveform input. As shown in FIG. 4, when the power source provides square wave signal the power dissipated in the power amplifier will become 0% and the power efficiency can be 100% maximally, if the resistive components in the power amplifier are ignored. As those skilled in the art can understand, most oscillators have a square-wave output by default. Usually, the square wave is converted to sinusoidal wave through a filter. Therefore, using square wave as an input signal can save the components (and thus save the cost) in the power source in addition to improve the power efficiency. Further, the use of square wave allows using the Class A power amplifier for the wireless power transfer because the efficiency will not be affected by the type of power amplifier.

FIG. 5a shows an example of the square wave with the frequency f1. According to the Fourier transform as shown in Equation 1, the square wave shown in FIG. 5a can be broken down into a fundamental component and its harmonic components such as a fundamental frequency f1 and its odd harmonics 3f1, 5f1 and so on.

$$\text{square wave} = \frac{4}{\pi}\Bigl(\cos 2\pi f1t + \frac{1}{3}\cos 2\pi 3f1t + \frac{1}{5}\cos 2\pi 5f1t + \frac{1}{7}\cos 2\pi 7f1t + ...\Bigr) \quad \text{Equation 1}$$

FIG. 5b shows the Fourier transform of square wave. As can be seen, FIG. 5b only shows the fundamental component f1, its 3rd order harmonic component f3=3f1 and its 5th order harmonic component f5=5f1. Those skilled in the art will understand that other harmonic components can exist. FIG. 5b and FIG. 5c respectively shows the 3rd order harmonic component and the 5th order harmonic component of the square wave.

As can be seen, the square wave can be broken down into different frequency components. Thus, simply apply the square wave to the wireless power transfer system shown in FIG. 2 may waste the power of harmonic components.

Figure 6:
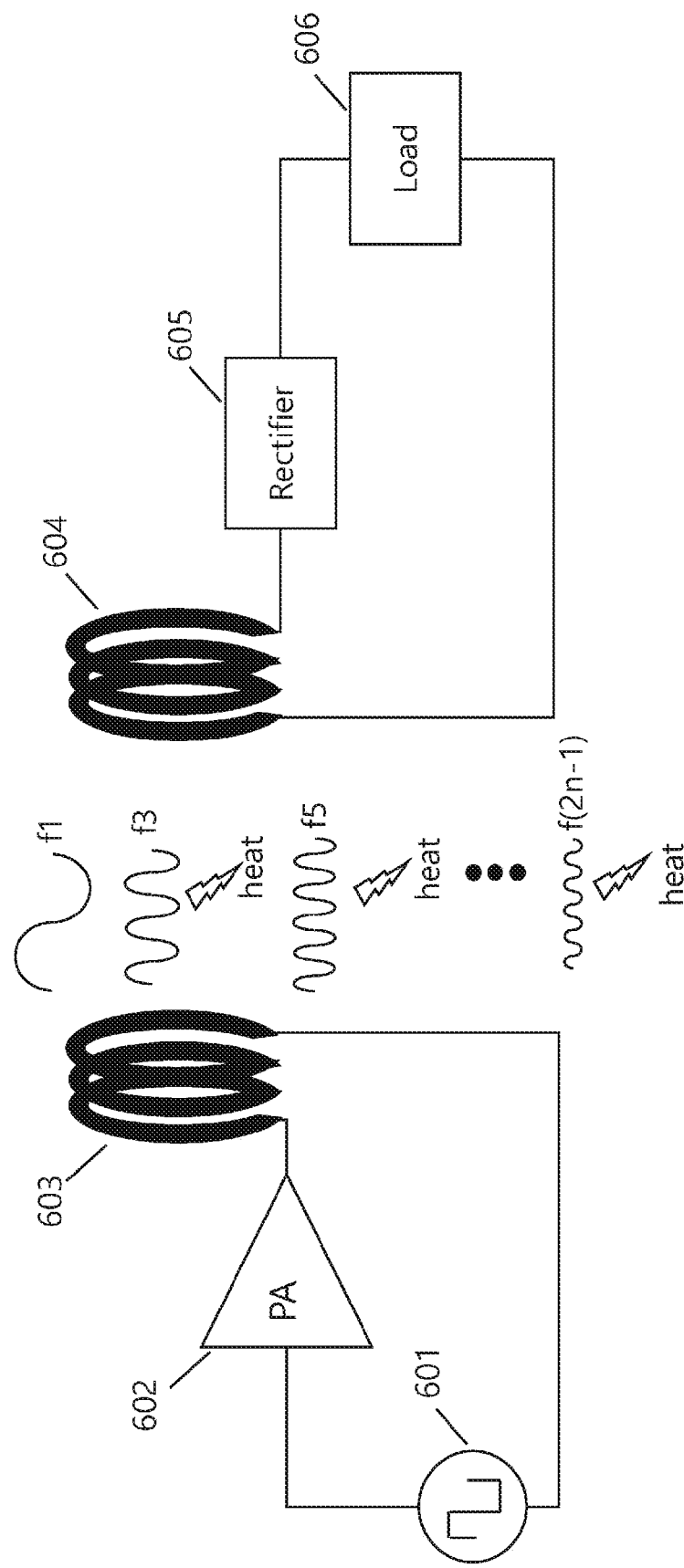
FIG. 6 shows the situation where the square wave is applied to the wireless power transfer system shown in FIG. 2.

FIG. 6 shows the situation where the square wave is applied to the wireless power transfer system shown in FIG. 2. As FIG. 6 shows, the power source 601 provides a square wave to the power amplifier 602. The power dissipated in the power amplifier will be very little as the square is used. As we mentioned above, in order to increase the power efficiency, the frequency of source should match with the resonant frequency of both the coil in source 603 and the coil in the destination 604. However, the square wave is consisted of many frequency components, and one pair of resonant coils 603 and 604 normally can only match one frequency. Therefore, typically, the resonant frequency of both the coil in source 603 and the coil in the destination 604 will match with the fundamental frequency component of the square wave so that the fundamental frequency component can be transferred effectively via the pair of coils 603 and 604. However, the harmonic components of the square wave will not be effectively transferred because of the mismatched frequencies. Thus the power of harmonic components of the square wave will be wasted and dissipated through the heat.

To further improve the efficiency, the suggested solution is to provide the resonant inductance to the harmonic components as well as a fundamental component so it can provide higher efficiency in wireless power transfer and less power loss dissipated. To achieve high power efficiency and minimize the dissipation for harmonics components, it needs to match resonant frequency of the coils with the frequency of the fundamental and its harmonic components respectively.

Figure 7:
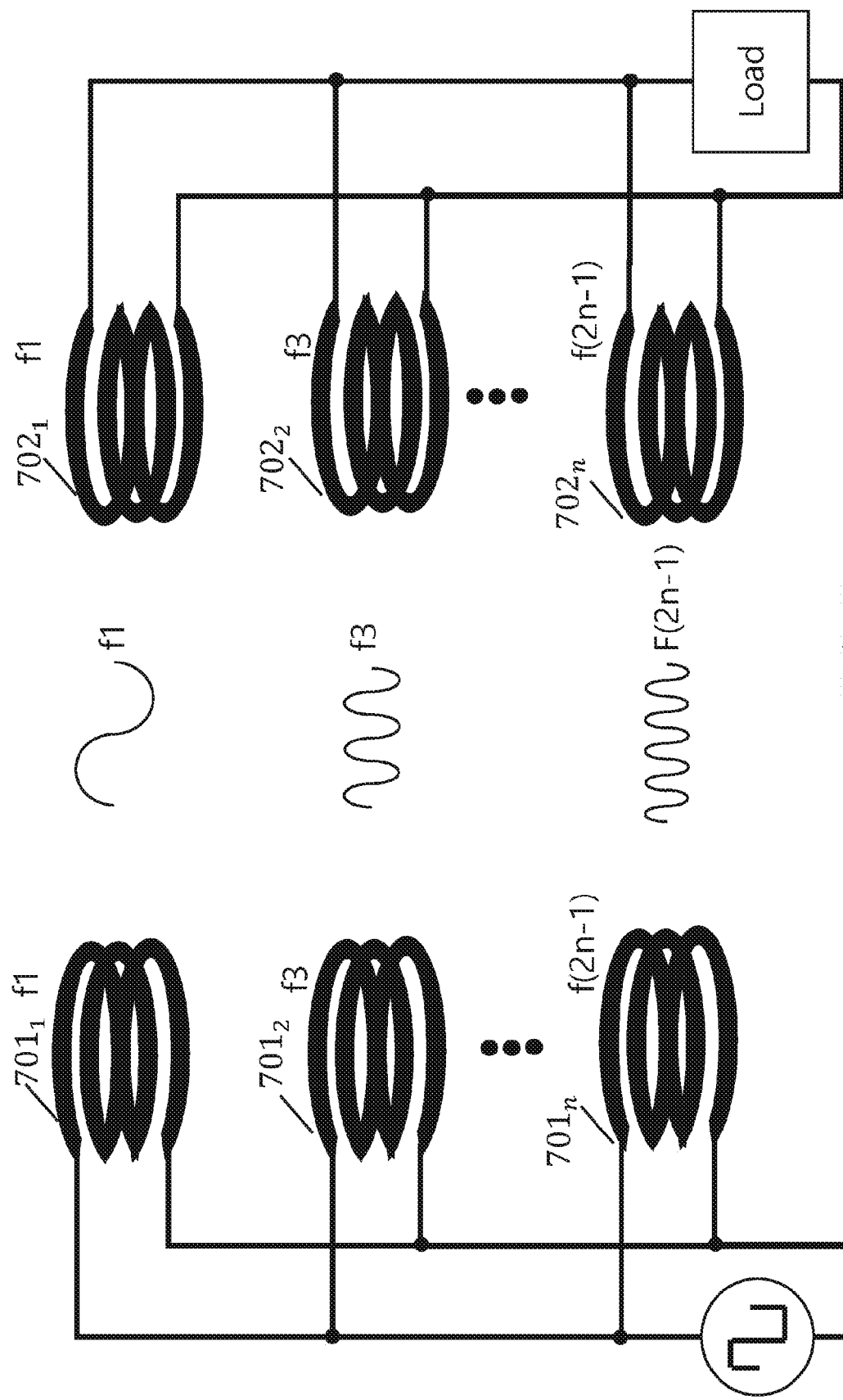
FIG. 7 shows a resonant inductive wireless power transfer according to an embodiment.

FIG. 7 shows a resonant inductive wireless power transfer according to an embodiment. For simplicity, the power amplifier and rectifier circuits are not described in the FIG. 7 but they can be included implicitly.

As shown in FIG. 7, at the transmitting side, a plurality of coils $701_1$-$701_n$ are coupled in parallel, and those coils are coupled to the power source respectively. In an embodiment, the plurality of coils have different resonant frequencies. For example the resonant frequency of the first coil in source $701_1$ can equal to the fundamental frequency of the square wave provided by the power source. The resonant frequency of the second coil in source $701_2$ equals to the 3rd order component frequency of the square wave. The resonant frequency of the nth coil in source $701\ n$ equals to the $(2n-1)$th order component frequency of the square wave, wherein n is an integer larger than 0. At the receiving side, a plurality of coils $702_1$-$702\ n$ are coupled in parallel, and those coils are coupled to the load respectively. In an embodiment, the plurality of coils have different resonant frequencies. For example the resonant frequency of the first coil in destination $702_1$ can equal to the fundamental frequency of the square wave provided by the power source. The resonant frequency of the second coil in destination $702_2$ equals to the 3rd order component frequency of the square wave. The resonant frequency of the nth coil in destination $701\ n$ equals to the $(2n-1)$th order component frequency of the square wave, wherein n is an integer larger than 0.

As can be seen in FIG. 7, the resonant frequencies of coil $701_1$ and coil $702_1$ equal to the fundamental frequency of the square wave provided by the power source so the power in f1 frequency can be delivered to the destination load maximally. Also, the coil $701_2$ and the coil $702_2$ have resonant frequencies that are same as 3rd order harmonics component of the square wave so the power in f3 frequency can be delivered to destination maximally. It is also the case for the $(2n-1)$th order component. Therefore, the resonant inductive wireless power transfer shown in FIG. 7 can deliver the power in fundamental frequency as well as in harmonic component frequency so the efficiency will be improved.

In order to reduce the interference between the coils and to decrease the cost and the size of the coil, the wireless power transfer can use a combined coil structure 812 instead of using a plurality of coils corresponding to different frequencies respectively.

FIG. 8a shows a resonant inductive wireless power transfer using a combined coil according to another embodiment. For simplicity, the power amplifier and rectifier circuits are not described in the FIG. 8a but they can be included implicitly. As shown in FIG. 8a, at the transmitting side, a combined coil is coupled to the power source 801. In an embodiment, the combined coil structure 812 comprises a plurality of sub coils. In an embodiment, there are n sub coils, where n is an integer larger than 1. In an embodiment, the plurality of sub soils are coupled in series. That is the first end $805_1$ of the first sub coil $802_1$ is coupled to the first terminal 816 of the power source 801 and the second end $806_n$ of the nth sub coil $802_n$ is coupled to the second terminal 817 of the power source 801.

In an embodiment, a first low pass filter LPF1 is coupled between the power source 801 and the first end $805_1$ of the first sub coil $802_1$. In another embodiment, the first low pass filter LPF1 is coupled between the second end $806_1$ of the first sub coil $802_1$ and the first end $805_2$ of the second sub coil $802_2$. In an embodiment, a low pass filter is coupled between the other neighbor sub coils. For example, the second low pass filter LPF2 is coupled between the second end $806_2$ of the second sub coil $802_2$ and the first end $805_3$ of the third sub coil $802_3$. In an embodiment, there are n−1 low pass filters in the transmitting side and the (n−1)th low pass filter LPF(n−1) is coupled between the second end $806_n$ of the (n−1)th sub coil $802_{n1}$ and the first end $805_n$ of the nth sub coil $802_n$.

In an embodiment, the first low pass filter LPF1 is configured to pass the first frequency and the frequency lower than the first frequency but block the second frequency and the frequency higher than the second frequency, where the first frequency corresponds to the fundamental frequency of the square wave provided by the power source 801 and the second frequency corresponds to the 3rd order harmonic frequency of the square wave provided by the power source 801. In another embodiment, the first low pass filter LPF1 can be replaced by a band pass filter allowing the first frequency to pass but blocking other frequencies. In an embodiment, the second low pass filter LPF2 is configured to pass the second frequency and the frequency lower than the second frequency but block the third frequency and the frequency higher than the third frequency, where the third frequency corresponds to the 5th order harmonic frequency of the square wave provided by the power source 801. The (n−1)th low pass filter LPF(n−1) is configured to pass the (n−1)th frequency and the frequency lower than the (n−1)th frequency but block the nth frequency and the frequency higher than the nth frequency, where the nth frequency corresponds to the (2n−1)th order harmonic frequency of the square wave provided by the power source 801.

In an embodiment, a plurality of high pass filters are coupled between the first terminal 816 of the power source 801 and a plurality of sub coils $802_2$-$802_n$ respectively. For example, the first high pass filter HPF1 is coupled between the first terminal 816 of the power source 801 and the first end $805_2$ of the second sub coil $802_2$. The second high pass filter HPF2 is coupled between the first terminal 816 of the power source 801 and the first end $805_3$ of the third sub coil $802_3$. In an embodiment, there are n−1 high pass filters in the transmitting side and the (n−1)th high pass filter HPF(n−1) is coupled between the first terminal 816 of the power source 801 and the first end $805_n$ of the nth sub coil $802_n$.

In an embodiment, the first high pass filter HPF1 is configured to block the first frequency and the frequency lower than the first frequency but pass the second frequency and the frequency higher than the second frequency, where the first frequency corresponds to the fundamental frequency of the square wave provided by the power source 801 and the second frequency corresponds to the 3rd order harmonic frequency of the square wave provided by the power source 801. The second high pass filter HPF2 is configured to block the second frequency and the frequency lower than the second frequency but pass the third frequency and the frequency higher than the third frequency, where the third frequency corresponds to the 5th order harmonic frequency of the square wave provided by the power source 801. The (n−1)th high pass filter HPF(n−1) is configured to block the (n−1)th frequency and the frequency lower than the (n−1)th frequency but pass the nth frequency and the frequency higher than the nth frequency, where the nth frequency corresponds to the (2n−1)th order harmonic frequency of the square wave provided by the power source 801.

In an embodiment, the high pass filters can be replaced by band pass filters which pass only a defined frequency band but block other frequency bands. For example, the (n−1)th high pass filter can be replaced by a bandpass filter passing the nth frequency but block other frequencies. In an embodiment, when a band pass filter is used to replace the high pass filter coupling to one end of the sub coil, the low pass filter coupling to the other end of the sub coil can be omitted. For example, the first high pass filter HPF1 coupling to one end of the second sub coil $802_2$ can be replaced by a band pass filter only allowing the second frequency to pass. In this case, the second low pass filter LPF2 coupling to the other end of the second sub coil $802_2$ can be omitted.

As shown in FIG. 8a, at the receiving side, a combined coil structure 814 is coupled to the load 803. In an embodiment, the combined coil comprises a plurality of sub coils. In an embodiment, there are n sub coils, where n is an integer larger than 1. In an embodiment, the plurality of sub soils are coupled in series. That is the first end $807_1$ of the first sub coil $804_1$ is coupled to the first terminal 818 of the load 803 and the second end $808_n$ of the nth sub coil $804_n$ is coupled to the second terminal 819 of the load 803.

In an embodiment, a first low pass filter LPF1 is coupled between the load 803 and the first end $807_1$ of the first sub coil $804_1$. In another embodiment, the first low pass filter LPF1 is coupled between the second end $808_1$ of the first sub coil $804_1$ and the first end $807_2$ of the second sub coil $804_2$. In an embodiment, a low pass filter is coupled between the other neighbor sub coils. For example, the second low pass filter LPF2 is coupled between the second end $808_2$ of the second sub coil $804_2$ and the first end $807_3$ of the third sub coil $804_3$. In an embodiment, there are n−1 low pass filters in the receiving side and the (n−1)th low pass filter LPF(n−1) is coupled between the second end $808_n$ of the (n−1)th sub coil $804_{n1}$ and the first end $807_n$ of the nth sub coil $804_n$.

In an embodiment, the first low pass filter LPF1 is configured to pass the first frequency and the frequency lower than the first frequency but block the second frequency and the frequency higher than the second frequency, where the first frequency corresponds to the fundamental frequency of the square wave provided by the power source 801 and the second frequency corresponds to the 3rd order harmonic frequency of the square wave provided by the power source 801. In another embodiment, the first low pass filter LPF1 can be replaced by a band pass filter allowing the first frequency to pass but blocking other frequencies. In an embodiment, the second low pass filter LPF2 is configured to pass the second frequency and the frequency lower than the second frequency but block the third frequency and the frequency higher than the third frequency, where the third frequency corresponds to the 5th order harmonic frequency of the square wave provided by the power source 801. The (n−1)th low pass filter LPF(n−1) is configured to pass the (n−1)th frequency and the frequency lower than the (n−1)th frequency but block the nth frequency and the frequency higher than the nth frequency, where the nth frequency corresponds to the (2n−1)th order harmonic frequency of the square wave provided by the power source 801.

In an embodiment, a plurality of high pass filters are coupled between the first terminal 818 of the load 803 and a plurality of sub coils $804_2$-$804_n$ respectively. For example, the first high pass filter HPF1 is coupled between the first terminal 816 of the load 801 and the first end $807_2$ of the second sub coil $804_2$. The second high pass filter HPF2 is coupled between the first terminal 818 of the load 803 and the first end $807_3$ of the third sub coil $804_3$. In an embodiment, there are n−1 high pass filters in the receiving side and the (n−1)th high pass filter HPF(n−1) is coupled between the first terminal 818 of the load 803 and the first end $807_n$ of the nth sub coil $804_n$.

In an embodiment, the first high pass filter HPF1 is configured to block the first frequency and the frequency lower than the first frequency but pass the second frequency and the frequency higher than the second frequency, where the first frequency corresponds to the fundamental frequency of the square wave provided by the power source 801 and the second frequency corresponds to the 3rd order harmonic frequency of the square wave provided by the power source 801. The second high pass filter HPF2 is configured to block the second frequency and the frequency lower than the second frequency but pass the third frequency and the frequency higher than the third frequency, where the third frequency corresponds to the 5th order harmonic frequency of the square wave provided by the power source 801. The (n−1)th high pass filter HPF(n−1) is configured to block the (n−1)th frequency and the frequency lower than the (n−1)th frequency but pass the nth frequency and the frequency higher than the nth frequency, where the nth frequency corresponds to the (2n−1)th order harmonic frequency of the square wave provided by the power source 801.

In an embodiment, the high pass filters can be replaced by band pass filters which pass only a defined frequency band but block other frequency bands. For example, the (n−1)th high pass filter can be replaced by a bandpass filter passing the nth frequency but block other frequencies. In an embodiment, when a band pass filter is used to replace the high pass filter coupling to one end of the sub coil, the low pass filter coupling to the other end of the sub coil can be omitted. For example, the first high pass filter HPF1 coupling to one end of the second sub coil $802_2$ can be replaced by a band pass filter only allowing the second frequency to pass. In this case, the second low pass filter LPF2 coupling to the other end of the second sub coil $802_2$ can be omitted.

FIG. 8b shows the signal flow of the fundamental frequency f1 of the square wave provided by the power source 801 in the transmitting side. As mentioned above, all of the high pass filters HPF1-HPF(n−1) block the first frequency corresponding to the fundamental frequency f1 of the square wave provided by the power source 801. In addition, all of the low pass filters LPF1-LPF(n−1) pass the first frequency. Therefore, the signal with fundamental frequency f1 passes all of the low pass filters LPF1-LPF(n−1) and thus goes through the entire combined coil (i.e. the first sub coil $802_1$ to the last sub coil (the nth sub coil 802 $n$)), as shown by the arrow. As mentioned above, in order to increase the power efficiency, the frequency of source should match with the resonant frequency of coil. Thus, the entire combined coil (sub coils $802_1$ to 802 $n$) has the resonant frequency corresponding to the fundamental frequency f1 of the square wave provided by the power source 801 and transfers signal with f1 frequency to the destination effectively.

FIG. 8c shows the signal flow of the 3rd order harmonic frequency f3 of the square wave provided by the power source 801 in the transmitting side. As mentioned above, only the first high pass filters HPF1 passes the second frequency corresponding to the 3rd order harmonic frequency f3 of the square wave provided by the power source 801. In addition, only the first low pass filters LPF1 blocks the second frequency. Therefore, the signal with 3rd order harmonic frequency f3 passes the first high pass filter HPF1 and the low pass filters LPF2-LPF(n−1) and thus goes through the sub combined coil from the second sub coil $802_2$ to the last sub coil (the nth sub coil $802_n$ as shown by the arrow. As mentioned above, in order to increase the power efficiency, the frequency of source should match with the resonant frequency of coil. Thus, the sub combined coil from the second sub coil $802_2$ to the nth sub coil $802_n$ has the resonant frequency corresponding to the 3rd order harmonic frequency f3 of the square wave provided by the power source 801 and transfers signal with f3 frequency to the destination effectively.

Based on FIG. 8b and FIG. 8c, those skilled in the art can understand that the signal with mth frequency corresponding to the (2m−1)th order harmonic frequency goes through the sub combined coil from $802_m$ to $802_n$ in the transmitting side, where m is an integer and 1≤m≤n. Thus, the sub combined coil from the mth sub coil $802_m$ to the nth sub coil $802_n$ has the resonant frequency corresponding to the (2m−1)th order harmonic frequency f(2m−1) of the square wave provided by the power source 801 and transfers signal with f(2m−1) frequency to the destination effectively. The signal flow in the receiving side is similar to the signal flow in the receiving side. To simplify the specification, the signal flow in the receiving side is omitted. Generally, the resonant frequency of the coil is shown in Equation 2.

$$\text{resonant frequency} = \frac{1}{2\pi\sqrt{LC}} \quad \text{Equation 2}$$

where L is the inductance of coil and C is the capacitance of coil.

The inductance of coil will be estimated approximately by Equation 3.

L=μn2S1   Equation 3 where L is relative permeability, n is turn per unit length, S is cross sectional area and 1 is the length of coil.

According to Equation 2 and Equation 3, the resonant frequency will decrease as the length of coil increases given that the S and n remain unchanged, as shown in Equation 4.

$$\text{resonant frequency} \, \alpha \frac{1}{\sqrt{L}} \alpha \frac{1}{\sqrt{l}} \quad \text{Equation 4}$$

According to Equation 4 and the disclosure above, the resonant frequency of the combined coil can be calculated as below:

$$f1 \, \alpha \frac{1}{\sqrt{Lcn + ...c2 + c1}} \alpha \frac{1}{\sqrt{lcn + ...c2 + c1}} \quad \text{Equation 5}$$

$$f3 \, \alpha \frac{1}{\sqrt{Lcn + ...c2}} \alpha \frac{1}{\sqrt{lcn + ...c2}} \quad \text{Equation 6}$$

$$f(2m-1) \frac{1}{\sqrt{Lcn + ...cm}} \alpha \frac{1}{\sqrt{lcn + ...cm}} \quad \text{Equation 7}$$

where Lcn+ . . . +c2+c1 is the inductance of the combined coil from the first sub coil to the nth sub coil; lcn+ . . . + c2+c1 is the length of the combined coil from the first sub coil to the nth sub coil; Lcn+ . . . +c2 is the inductance of the combined coil from the second sub coil to the nth sub coil; lcn+ . . . +c2 is the length of the combined coil from the second sub coil to the nth sub coil; Lcn+ . . . +cm is the m-ductance of the combined coil from the mth sub coil to the nth sub coil; lcn+ . . . +cm is the length of the combined coil from the mth sub coil to the nth sub coil. Therefore, based on Equation 5 to Equation 7, the length relationship between those sub coils can be defined. For example, if there are only two sub coils, the length of the first sub coil should be 8 times of the length of the second sub coil.

Since the corresponding combination of corresponding sub coils in the transmitting side and the receiving side have the same resonant frequency, the corresponding sub coils in the transmitting side and the receiving side have the same length.

As those skilled in the art can understand, the resonant frequency of the coil is always designed to match the fundamental frequency of the source in the legacy solution. Therefore, the length of the entire combined coil according to the embodiments of this application may be similar to the length of the coil in the legacy solution. Thus, the resonant inductive power transfer using a combined coil according to the embodiments of this application can improve the power efficiency and the charging speed without increasing the total length of the coils.

Those skilled in the art can understand that the number of sub coils in the combined coil is flexible. The number of the sub coils can be determined based on the cumulative power of the fundamental and its harmonic components of the square wave.

According to Table 1, the fundamental component has 81% of the total power, the 3rd order harmonic component has 9% of the total power, $5^{th}$ component has 3% of the total power.

TABLE 1

Power calculation in fundamental and its harmonic components
Assumed that we use the harmonic component up to 5th
order, the power can be transferred up to 93% of the
source. The combined coil can be designed according
to the order of harmonic frequency to be used.

|  | avg energy/T | energy (%) | cumulative (%) |
|---|---|---|---|
| Square wave | 1.00 | 100 | 100 |
| Fundamental | 0.81 | 81 | 81 |
| 3rd order | 0.09 | 9 | 90 |
| 5th order | 0.03 | 3 | 93 |
| 7th order | 0.02 | 2 | 95 |
| 9th order | 0.01 | 1 | 96 |
| 11th order | 0.01 | 1 | 97 |
| 13th order | 0.00 | 0 | 97 |

Figure 9:
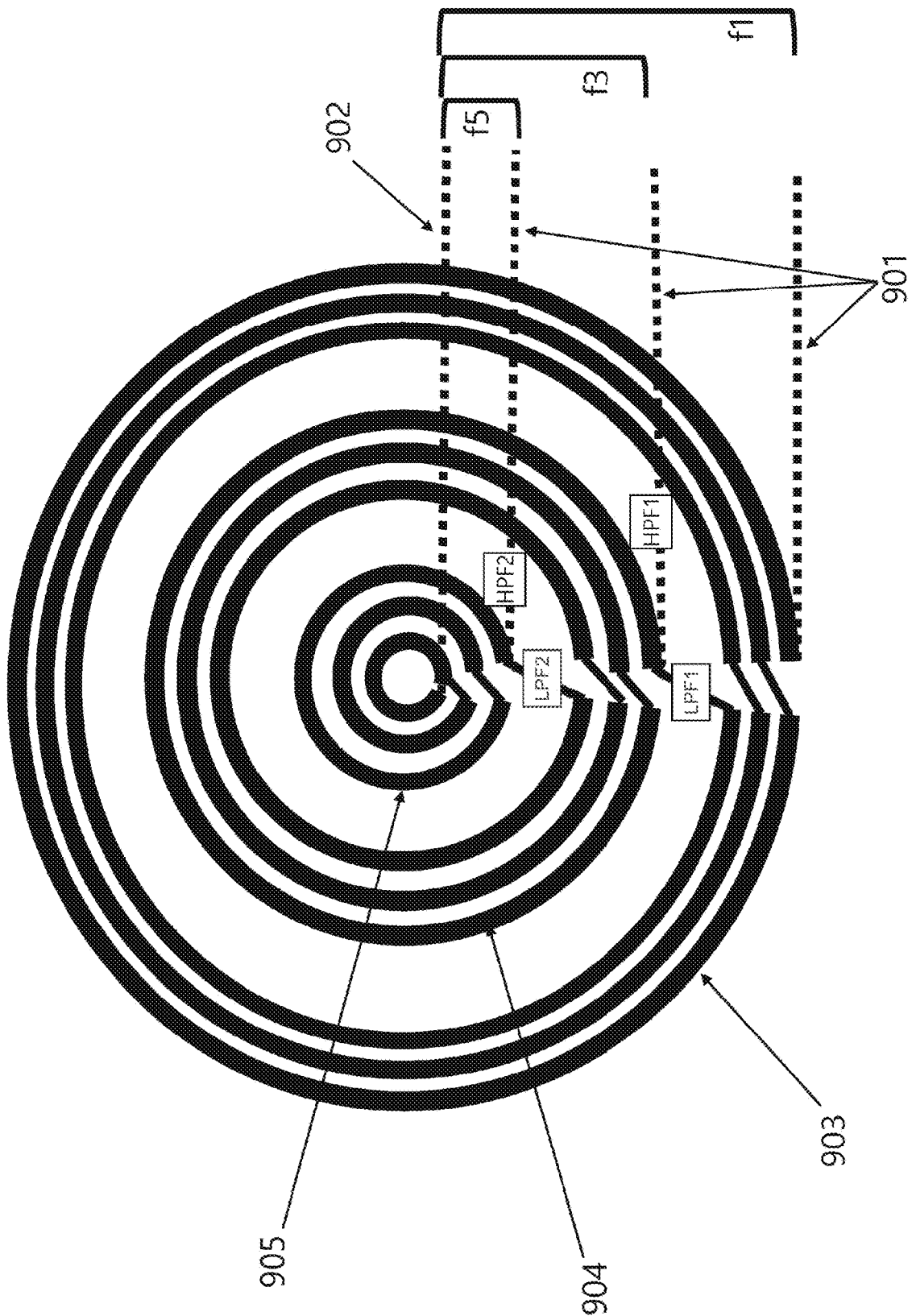
FIG. 9 shows an example combined coil that support resonant frequency up to 5th order harmonic according to an embodiment.

FIG. 9 shows an example combined coil that support resonant frequency up to 5th order harmonic according to an embodiment. The combined coil can transfer maximally 93% of the input source power. In FIG. 9 it shows the size of the combined coil increases as the resonant frequency decreases. As shown in FIG. 9, the combined coil can be in plane. As shown in FIG. 9, the feed lines 901 and 902 are coupled to the first terminal and the second terminal of the power source or the load respectively. The first low pass filter LPF1 is configured to pass fundamental frequency and block 3rd order harmonic frequency. The second low pass filter LPF2 is configured to pass 3rd order harmonic frequency and block 5th order harmonic frequency. The first high pass filter HPF1 is configured to block fundamental frequency and pass 3rd order harmonic frequency. The second high pass filter HPF2 is configured to block 3rd order harmonic frequency and pass 5th order harmonic frequency. The combination of the first sub coil 903, the second sub coil 904 and the third sub coil 905 has the resonant frequency of the fundamental frequency f1. The combination of the second sub coil 904 and the third sub coil 905 has the resonant frequency of the 3rd order harmonic frequency f3. The third sub coil 905 has the resonant frequency of the 5th order harmonic frequency f5.

In FIG. 9 shows the circular form of coil, however the any of forms can be employed if it works as inductor. FIG. 10 shows an example combined coil that has rectangular form coil according to an embodiment. The configuration of the rectangular coil is similar to the circular coil shown in FIG. 9, thus the configuration of the rectangular coil is omitted here. Since the many devices such as mobile phones have a shape of rectangular, the rectangular coil can fit the devices very well. Thus, the rectangular coil can occupy larger area in the device and increase the speed of charging.

Those skilled in the art can understand that the square wave is just an example, other types of wave forms may be applied as needed. Further, as discussed above, the first low pass filter LPF1 and the high pass filters can be replaced by band pass filters.

This application also discloses the method of operating the resonant inductive wireless power transfer. In an embodiment, the method comprises providing a square wave to the resonant inductive wireless power transfer. In an embodiment, the fundamental frequency of the square wave corresponds to the resonant frequency of the combined coil. The 3rd order harmonic frequency of the square wave corresponds to the resonant frequency of sub combined coil from the second sub coil $802_2$ to the last sub coil (the nth sub coil $802$ n). The (2m−1)th order harmonic frequency corresponds to the resonant frequency of the sub combined coil from $802_m$ to $802_n$. Those skilled in the art can understand that other forms of input can be applied as long as the fundamental frequency and its harmonic frequencies correspond to the combinations of certain sub coils.

FIG. 11 shows a method of manufacturing an apparatus for wireless power transferring according to an embodiment. As mentioned above, in an embodiment, the apparatus can be coupled to a power source to function as a wireless power transmitter. In another embodiment, the apparatus can be coupled to a load to function as a wireless power receiver.

As shown in FIG. 11, the method comprises coupling a combined coil between a first terminal and a second terminal of the apparatus, at the step of 1101. In an embodiment, the combined coil includes a first sub coil having a first end and a second end and a second sub coil having a first end and a second end. The first end of the first sub coil is coupled to the first terminal and the second end of the first sub coil is coupled to the first end of the second sub coil.

The method further comprises coupling a first filter in series with the first sub soil at the first end or the second end of the first sub coil, at the step of 1102. In an embodiment, the first filter allows a first frequency to pass but blocks a second frequency. When a square wave is applied by the power source, the first frequency corresponds to the fundamental frequency of the square wave and the second frequency corresponds to the 3rd order harmonic frequency of the square wave. In an embodiment, the first filter is a low pass filter. In another embodiment, the first filter can be a band pass filter that passes the first frequency and blocks other frequencies.

The method further comprises coupling a second filter between the first end of the second sub coil and the first terminal, at the step of 1103. In an embodiment, the second filter allows the second frequency to pass but blocks the first frequency. In an embodiment, the second filter can be a high pass filter. In another embodiment, the second filter can be a band pass filter that passes the second frequency and blocks other frequencies.

In an embodiment, the first frequency is inversely proportional to the square root of the combined coil length and the second frequency is inversely proportional to the square root of the difference between the combined coil length and the first sub coil length. In an embodiment, the combined coil is in plane.

In an embodiment, the combined coil can have more than two sub coils. Further, more or less low pass filters, high pass filters and/or band pass filters can be placed into proper positions. The proper positions and the configurations of those filters can be determined based on above contents of this application, therefore are omitted here.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. An apparatus for wireless power transferring, comprising:
   a first terminal and a second terminal;
   a combined coil coupled between the first terminal and the second terminal, wherein the combined coil including a first sub coil having a first end and a second end and a second sub coil having a first end and a second end, the first end of the first sub coil is coupled to the first terminal, the second end of the first sub coil is coupled to the first end of the second sub coil;
   a first filter coupled in series with the first sub coil at the first end or the second end of the first sub coil; and
   a second filter coupled between the first end of the second sub coil and the first terminal,
   wherein:
   the first filter allows a first frequency to pass and blocks a second frequency,
   the second filter allows the second frequency to pass and blocks the first frequency,
   the first frequency is lower than the second frequency,
   the first frequency is inversely proportional to the square root of the combined coil length,
   the second frequency is inversely proportional to the square root of the difference between the combined coil length and the first sub coil length,
   the first terminal and the second terminal are coupled across a power source, thereby the apparatus is configured as an apparatus for wireless power transmitting, and
   the power source provides a square wave, fundamental frequency of the square wave corresponds to resonant frequency of the combined coil.

2. The apparatus according to claim 1, wherein the combined coil further comprising a third sub coil having a first end and a second end;
   wherein the apparatus further comprising:
   a third filter coupled between the first end of the third sub coil and the first terminal,
   wherein the third filter allows the third frequency to pass and blocks the first frequency and the second frequency,
   and wherein the third frequency is inversely proportional to the square root of the difference between the combined coil length and the sum of the first sub coil length and the second sub coil length.

3. The apparatus according to claim 1, wherein the first filter is a band pass filter or a low pass filter.

4. The apparatus according to claim 1, wherein the second filter is a band pass filter or a high pass filter.

5. The apparatus according to claim 2, wherein the third filter is a band pass filter or a high pass filter.

6. The apparatus according to claim 1, wherein the first terminal and the second terminal are coupled across a load, thereby the apparatus is configured as an apparatus for wireless power receiving.

7. The apparatus according to claim 1, wherein the combined coil is in plane.

8. The apparatus according to claim 1, wherein the combined coil is in shape of circle or rectangular.

9. A method of manufacturing an apparatus for wireless power transferring, comprising:
   coupling a combined coil between a first terminal and a second terminal of the apparatus, wherein the combined coil including a first sub coil having a first end and a second end and a second sub coil having a first end and a second end, the first end of the first sub coil is coupled to the first terminal, the second end of the first sub coil is coupled to the first end of the second sub coil;
   coupling a first filter in series with the first sub soil at the first end or the second end of the first sub coil; and
   coupling a second filter between the first end of the second sub coil and the first terminal,
   wherein:
   the first filter allows a first frequency to pass and blocks a second frequency,
   the second filter allows the second frequency to pass and blocks the first frequency,
   the first frequency is lower than the second frequency,
   the first frequency is inversely proportional to the square root of the combined coil length,
   the second frequency is inversely proportional to the square root of the difference between the combined coil length and the first sub coil length,
   the first terminal and the second terminal are coupled across a power source, thereby the apparatus is configured as an apparatus for wireless power transmitting, and
   the power source provides a square wave, fundamental frequency of the square wave corresponds to resonant frequency of the combined coil.

10. The method according to claim 9, wherein the combined coil is in plane.

* * * * *